United States Patent [19]

Kohashi

[11] 3,829,743

[45] Aug. 13, 1974

[54] VARIABLE CAPACITANCE DEVICE

[75] Inventor: Tadao Kohashi, Osaka, Japan

[73] Assignee: Matsushita Electric Industrial Company, Kadoma City, Osaka, Japan

[22] Filed: July 10, 1972

[21] Appl. No.: 270,171

Related U.S. Application Data

[62] Division of Ser. No. 72,695, Sept. 16, 1970, abandoned.

[30] Foreign Application Priority Data

Sept. 18, 1969 Japan ............................44-75637
Sept. 19, 1969 Japan ............................44-76061
Sept. 22, 1969 Japan ............................44-77179

[52] U.S. Cl.............357/23, 357/14, 357/4, 357/52, 307/304, 307/311, 178/7.2

[51] Int. Cl. ............................................ H01l 11/14

[58] Field of Search..... 317/235 B, 235 AG, 234 U, 317/234 S; 307/311, 304; 178/7.2

[56] References Cited

UNITED STATES PATENTS 3,339,075 8/1967 Czepsi.................................. 250/213
3,384,829 5/1968 Sato....................................... 330/7
3,740,616 6/1973 Kohashi........................... 317/234 R

*Primary Examiner*—Martin H. Edlow

[57] ABSTRACT

This specification discloses variable capacitance devices which vary their capacitances under the influence of DC bias voltages or radiations. One embodiment comprises a PN junction diode, a dielectric thin film deposited on the surface of said junction diode at which the junction terminates and a conducting electrode deposited on the dielectric thin film, in which the area of an equivalent plate electrode formed in said junction diode is varied by changing the thickness of a depletion region. In another embodiment, a nonlinear resistance layer deposited on the dielectric thin film is employed. As a DC voltage as applied to the nonlinear resistance layer is increased, the lateral conductivity of the nonlinear resistance layer increases and the area of the equivalent plate electrode facing the conducting electrode is increased. A further embodiment employs a thin film transistor or a MIS transistor to vary the area of the equivalent plate electrode provided therein.

8 Claims, 14 Drawing Figures

VARIABLE CAPACITANCE DEVICE

This is a division, of application Ser. No. 72,695, filed Sept. 16, 1970 now abandoned.

This invention relates to variable capacitance devices which vary their capacitances under the influence of DC bias voltages or radiations.

A voltage-controlled capacitor is well known in the art as "varactor," in which the thickness of a depletion region formed in a PN junction diode is varied by changing a reverse bias voltage to vary the junction transition capacitance. However, the capacitor of the above type has the following disadvantages:

1. Application of a forward bias causes a marked decrease in Q valve of capacitor preventing its use as a capacitor;

2. An extremely high value of Q can not be obtained even with a reverse bias because the reversebiased saturation current is not exactly equal to zero;

3. Since an AC voltage is applied across the capacitor, being superimposed upon the reverse bias voltage, the amplitude of the AC voltage should not exceed the reverse voltage; and therefore, a large-amplitude operation is impossible;

4. The capacitance can not be varied over a wide range because the thickness of the depletion region with a zero bias is not equal to zero due to the contact potential difference for the junction and yet because the forward bias operation is impossible.

5. The capacitance is subject to modulation by the superimposed AC voltage.

6. The frequency limit above which the capacitor can not operates properly is relatively low because it is impossible to reduce the junction area to an extremely small value.

It is therefore an object of this invention to provide a new and improved variable capacitance device with a view to overcoming the above-stated disadvantages.

It is another object of this invention to provide a variable capacitance device having a thin film of dielectric material and in which the area of an equivalent plate electrode is varied by changing the thickness of a depletion region formed in a PN junction.

It is a further object of this invention to provide a variable capacitance device adapted for incorporation into an integrated circuit.

It is still further object of this invention to provide a variable capacitance device utilizing a metal-semiconductor junction and which varies its capacitance under the influence of radiations.

It is yet a further object of this invention to provide a variable capacitance device comprising a nonlinear resistance layer and in which the area of an equivalent plate electrode provided in said nonlinear resistance layer is varied by changing a DC voltage applied thereto.

It is a further object of this invention to provide a variable capacitance device comprising a thin film transistor and in which an equivalent plate electrode is provided by high conductivity portions formed in a channel of said transistor.

It is still further object of this invention to provide a variable capacitance device comprising a MOS or MIS transistor.

These and other objects of this invention will be apparent from the following description taken in conjunction with the accompanying drawings, in which.

Figure 1:
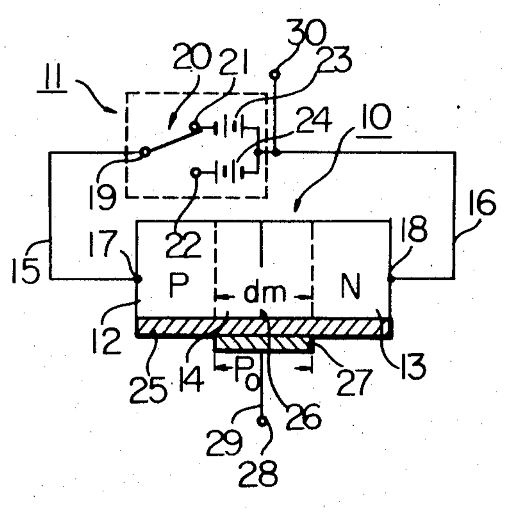
FIG. 1 is a schematic longitudinal section of a variable capacitance device according to one embodiment of this invention.

Referring now to the drawings and more particularly to FIG. 1, there is shown a variable capacitance device as constructed in accordance with one embodiment of this invention. The variable capacitance device comprises a PN junction diode 10 and a source of DC voltage, as generally indicated at 11. The PN junction diode 10 consists of a single crystal of germanium, silicon, gallium arsenide or any other semiconductor materials containing very minute quantities of certain impurities. Depending upon the type of impurity there are formed in the diode P and N regions 12 and 13 between which a depletion region 14 exists. A lead wire 15, 16 made of gold or aluminium is held in ohmic contact with an end surface of each of the P and N regions 12 and 13 as at 17 and 18, respectively. One lead 15 is connected to the movable contact 19 of a double-throw switch 20. The double-throw switch 20 has two fixed contacts 21 and 22 connected to two batteries 23 and 24, respectively, which in turn are connected together to the other lead 16 held in electrical contact with the N region 13.

As shown, a thin film 25 of high-insulation, low-dielectric-loss dielectric material is deposited on the side surface of the diode 10 perpendicular to the junction 26 by activation sputtering, plasma oxidation, plate oxidation or any other deposition techniques. The material of the thin film 25 may, for example, comprise SiO, $SiO_2$, $Al_2O_3$, $Ta_2O_5$, $TiO_2$, $PbTiO_3$ or SiN. The thin film 25 may preferably be 500 to 2,000 angstroms in thickness.

Deposited on the dielectric thin film 25 in an area underlying the depletion region 14 is a conducting electrode 27 which may comprise gold or aluminium. Preferably, the width $P_0$ of the conducting electrode 27 is so selected as to be substantially equal to or smaller than the maximum thickness dm of the depletion region 14 available with a reverse bias applied across the junction 26. The conducting electrode 27 is connected to a first terminal 28 of the present variable capacitance device by means of a lead 29. A second terminal 30 of the present device is connected to the lead 16 which is connected to the N region 13.

By way of example, an alloy-junction diode having a step junction formed therein will now be described briefly; the diode consists of germanium. The density of acceptors in the P region and the density of donors in the N region are selected to be, for example, of the order of $10^{21}m^{-3}$. With such densities of acceptors and donors, the contact potential difference for the junction is approximately 0.5 volts. The thickness of the depletion region with a zero bias applied to the junction is approximately 0.42 microns.

As will be seen, when the movable contact 19 is moved into engagement with the fixed contact 21, a reverse bias is applied across the junction. It is well known in the art that the thickness of the depletion region increases approximately in proportion to the square root of the reverse voltage as applied thereacross. Thus, with a reverse bias of −20 volts, the thickness of the depletion region is approximately 8.5 microns. If the reverse voltage is further increased beyond −20 volts, a breakdown takes place. Accordingly, the maximum value of the thickness of the depletion layer dm is approximately 8.5 microns. Therefore, it is preferable that the width $P_0$ of the conducting electrode 27 is approximately 7 to 8 microns.

Figures 2, 3:
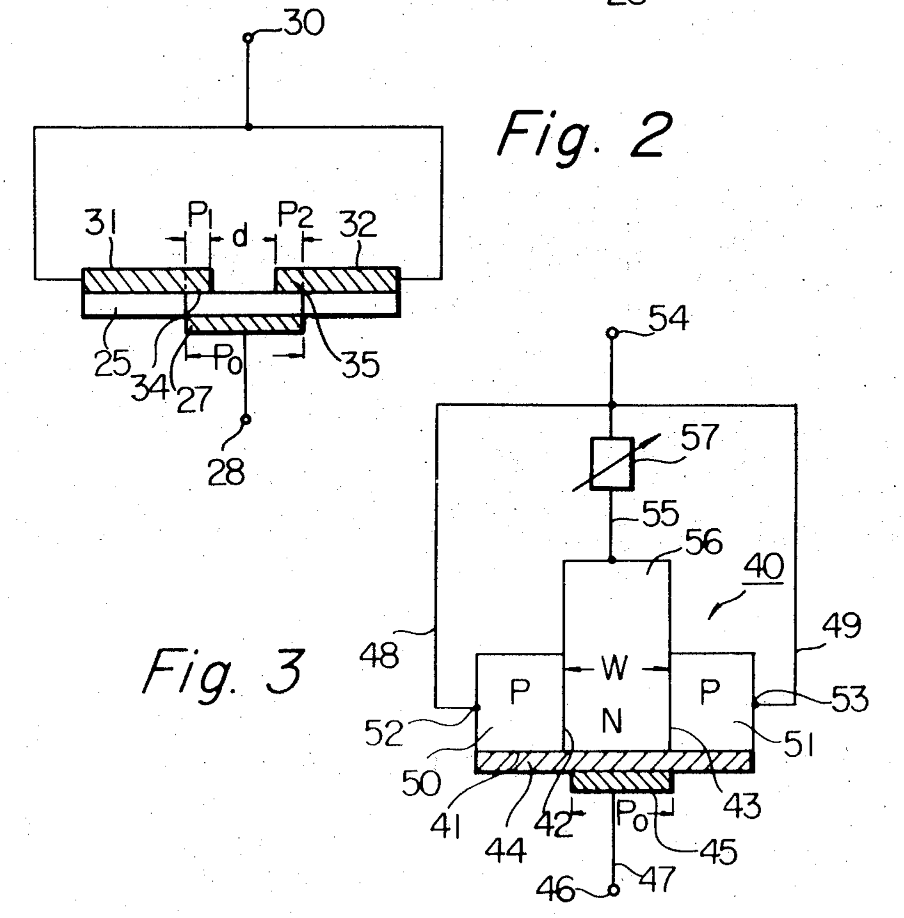
FIG. 2 is a view useful for explaining the principle on which the variable capacitance device of FIG. 1 operates.
FIG. 3 is a view similar to FIG. 1, but showing another embodiment of this invention.

FIG. 2 is a schematic view useful for explaining the principle upon which the present invention capacitance device operates. The P and N regions 12 and 13 of the junction diode 10 are shown as equivalent conducting electrodes 31 and 32, respectively, since a number of free carriers imparting a good conductivity to the P and N regions 12 and 13 are present therein. The depletion region 14 behaves as an insulator.

As described above, the thickness of the depletion region 14 varies with a bias potential as applied thereacross. The change in the thickness of the depletion region 14 causes a corresponding change in the total width ($P_1 + P_2$) of the portions 34 and 35 of the conducting electrodes 31 and 32 which face the conducting film electrode 27 with the dielectric thin film 25 interposed therebetween. Thus, as the bias voltage as applied across the junction 26 is varied, the capacitance between the first and second terminals 28 and 30 changes. The capacitance C per unit length is expressed as follows: $C = \epsilon (P_1 + P_2)/t = \epsilon (P_0 - d)/t$ where $\epsilon$ and $t$ represent dielectric constant and thickness of the dielectric thin film 25, and $P_0$ represents width of the conducting film electrode 27. The capacitance C decreases with increasing reverse voltage. On the other hand, when a forward bias is applied across the junction 26 by moving the movable contact 19 of the double-throw switch 20 into contact with the fixed contact 22, the thickness $d$ of the depletion region 14 decreases to substantially zero, causing the value $P_1 + P_2$ to become equal to $P_O$.

Although the prior-art variable capacitance device has as its capacitance the junction-transition capacitance which varies with a reverse bias applied thereacross, the present variable capacitance device comprises a dielectric thin film capacitor in which the equivalent area of one of the plate electrodes is varied in a gating fashion by changing the bias voltage as applied across the junction to vary the thickness of the depletion region, whereby to vary the capacitance.

Accordingly, the value of Q of the present device is determined by the dielectric thin film and therefore is extremely high as compared to that of the prior-art device utilizing the junction-transition capacitance. Further, the present variable capacitance device can be used with either a forward or reverse bias applied. In practical use as a variable capacitance device, an AC voltage is applied between the first and second terminals 28 and 30 of the present device. Under such conditions, the P and N regions 12 and 13 are AC wise at equal potentials, so that there is no AC voltage applied across the depletion region 14. Thus, a large-amplitude operation is possible because a DC bias imposes no limitation on the amplitude of the AC voltage. Furthermore, modulation of the capacitance by the AC voltage does not take place and a holestorage effect can be neglected. Still furthermore, the operating frequency range is extended to extremely high frequencies since the capacitance of the dielectric thin film 25 is employed in place of the junction-transition capacitance. It is to be noted that since the variable capacitance device according to this invention can be operated with either a forward or reverse bias an increased rate of change of the capacitance can be obtained. When the width $P_0$ of the conducting film electrode 27 is made larger than the maximum thickness dm of the depletion region 14, the capacitance developed by the width portion ($P_0 - dm$) behaves as a fixed capacitance, in which case, the rate of change of the total capacitance is reduced.

FIG. 3 illustrates a modification of the present variable capacitance device shown in FIG. 1. In this embodiment, a PNP alloy junction body 40 having a cut surface 41 perpendicular to the planes of the two PN junctions 42 and 43 is employed. Similarly, a thin film 44 of dielectric material is deposited upon and in extended area contact with the surface 41. A conducting film 45 of gold or aluminium is deposited upon the dielectric film 44 to form a first electrode. The first electrode 45 is connected to a first terminal 46 of the present device by means of a lead 47. A lead 48, 49 is held in ohmic contact with an end surface of each of the $P$ regions 50 and 51 as at 52 and 53, respectively. These leads 48 and 49 are connected together to a second terminal 54 of the present variable capacitance device. Another lead 55 is held in ohmic contact with the $N$ region 56 of the PNP junction body 40. The lead 55 is connected to a DC voltage source 57 which is capable of providing DC voltage of varying magnitudes and of any polarity. The DC voltage source 57 is connected to the second terminal 54. It is important that the thickness $W$ of the $N$ region 56, the maximum thickness $dm$ of the depletion region and the width $P_0$ of the conducting film electrode 45 should have the following relationship: $W \leq 2\,dm\ P_0 \leq 2\,dm$ In operation, as a reverse bias applied across the two PN junctions 42 and 43 of the transistor 40 is increased, the depletion regions formed near the PN junctions 42 and 43 extend from both sides into the *N* region 56 and eventually merge with each other. Since an equivalent electrode facing the conducting film electrode 45 with the dielectric film 44 interposed therebetween is provided by a portion of the *N* region 56 which has no depletion region extended thereinto, the increase in the reverse bias voltage causes a decrease in the capacitance appearing between the first and second terminals 46 and 54. When the depletion regions merge with each other, that is, a punchthrough occurs, the capacitance is approximately zero. By adjusting the magnitude and polarity of the DC voltage provided by the source 57, it is possible to arbitrarily change the capacitance. With such an arrangement, a relatively large capacitance can be obtained since the width $P_0$ of the conducting film electrode 45 can be increased. Although this description has been made in conjunction with the embodiment using a PNP junction body, it is to be understood that the concept of this invention is applicable also to an NPN junction.

Figure 4:
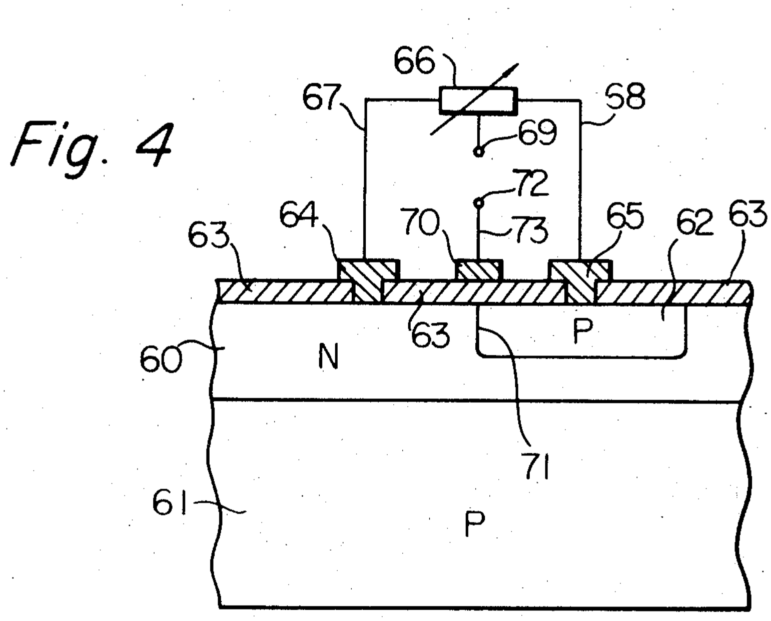
FIG. 4 is a schematic view showing a further embodiment of this invention.

FIG. 4 illustrates another modification of the present variable capacitance device which is adapted for incorporation into an integrated circuit. As shown, an N-type layer 60 is formed on a P-type substrate 61 by epitaxial growth or any other deposition techniques. A P-type region 62 is selectively formed in the N-type layer 60 by diffusion. A thin film 63 of the dielectric material as employed in the embodiment of FIG. 1 is deposited upon and in extended area contact with the N-type layer 60. Connections to the N-type layer 60 and the P-type region 62 are made by electrodes 64 and 65, respectively. The electrodes 64 and 65 are connected to a variable DC voltage source 66 by means of leads 67 and 68, respectively. The DC voltage source 66 is also connected to a first terminal 69 of the present device. A conducting film 70 acting as a second electrode is deposited upon the dielectric thin film 63 in an area overlying the junction 71 between the P-type region 62 and the N-type region 60. The second electrode 70 is connected to a second terminal 72 by means of a lead 73. As a reverse bias applied across the junction 71 is varied, the capacitance existing between the first and second terminals 69 and 72 changes.

Although this invention has been described in detail with response to the PN, PNP and NPN, other types of semiconductor junction such as PIN and $PIN^+N$ can be employed. Further, above-described semiconductor junction structures may have junctions of graded, abrupt, super-abrupt or other types, It should be noted that not only a semiconductor-semiconductor junction but also a metal-semiconductor junction can be utilized for the present invention.

Figures 5, 6:
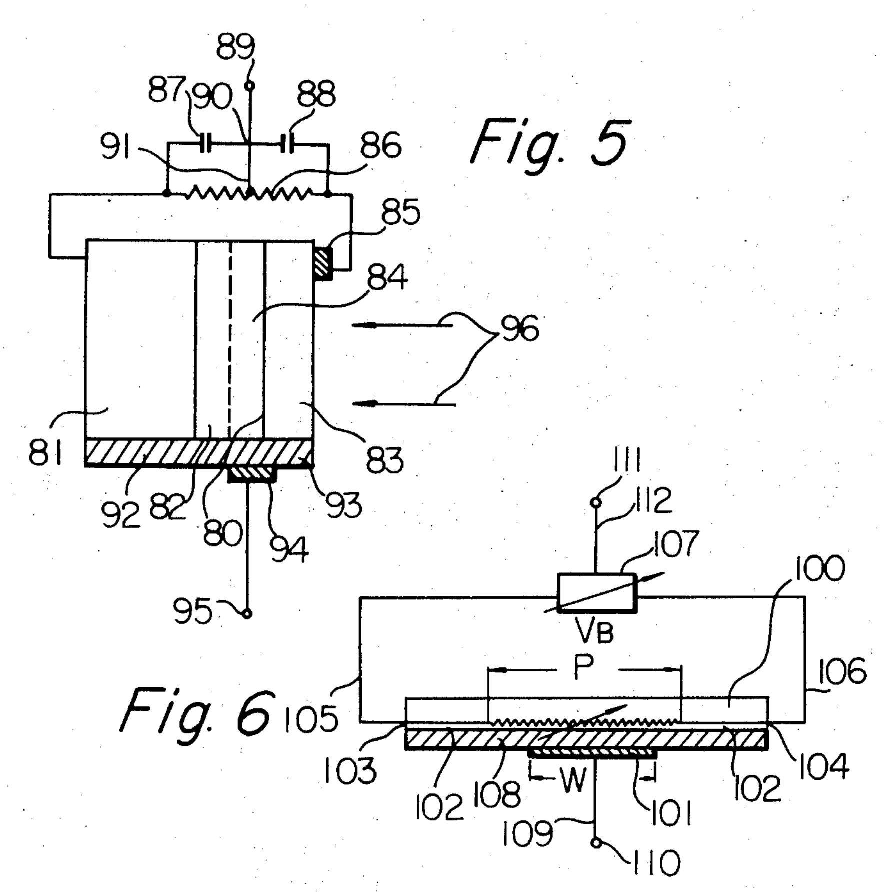
FIG. 5 is a schematic view showing still a further embodiment of this invention which varies its capacitance under the influence of radiations.
FIG. 6 is a schematic view showing a modification of this invention having a nonlinear resistance layer.

FIG. 5 illustrates a further embodiment of the present variable capacitance device which employs a metal-semiconductor junction 80. In this emboidment, a radiation such as light is irradiated onto the variable capacitance device to vary the capacitance thereof.

The variable capacitance device comprises a substrate 81 consisting of aluminium or iron. A layer 82 of amorphous selenium is vacuum deposited on the substrate 81 and then is heated at temperatures of about 180°C to form a metallized selenium layer. A translucent conducting film 83 of gold is deposited on the selenium layer 82, so that a depletion region 84 is formed therebetween. Connection to the conducting film 83 is made by a fusible alloy 85 which in turn is connected to one end of a resistor 86, the other end of which is connected to the substrate 81. The resistor 86 is paralleled by a series combination of two bypass condensers 87 and 88 each having a large capacitance. A first terminal 89 of the present device is connected to the point 90 between the two condensers 87 and 88 and to the middle point 91 of the resistor 86. Deposited upon the side surface 92 of the body perpendicular to the junction 80 is a thin film 93 of the dielectric material as employed in the embodiment of FIG. 1. A conducting film 94 is deposited upon the dielectric film 93 in an area underlying the junction 80. The conducting film 94 is connected to a second terminal 95 of the present device.

In operation, the body is irradiated by a radiation such as light L falling upon the translucent conducting film 83 in the direction of arrow 96. When this occurs, a number of electron-hole pairs is generated in the depletion region 84 to form a photocurrent which is caused to flow through the resistor 86 by the photogalvanic effect. The photocurrent causes a reduction in the thickness of the depletion region 84, thereby increasing the capacitance between the first and second terminals 89 and 95, respectively. It is to be understood that the variable capacitance devices as shown in FIGS. 1, 3 and 4 also can be arranged so that they vary their capacitances in response to radiant energy excitation.

FIG. 6 illustrates a further modification of the present variable capacitance device. In the figure, reference numeral 100 designates a nonlinear resistance layer having a thickness of approximately 100 to 300 microns. The material of the nonlinear resistance layer 100 may, for example, comprise cadmium sulfide activated with chloride (CdS:C1) and mixed with a suitable plastic binder such as plastic or vitreous material. It may be formed by sintering the CdS:C1 or SiC with clay. This nonlinear resistance layer 100 acts as an equivalent plate electrode whose area opposing conducting electrode 101 varies as the lateral resistance of the layer 100 is changed by varying the DC voltage applied thereacross.

A pair of bias electrodes 102 consisting of gold or aluminium are formed on one surface of the nonlinear resistance layer 100 by a suitable technique such as vapour deposition. The average spacing P of the gaps between the bias electrodes 102 may preferably be approximately 100 to 500 microns. The bias electrodes 102 are connected at their ends 103 and 104 to leads 105 and 106 which in turn are connected to a source 107 of variable DC voltage $V_B$.

Deposited upon and in extended area contact with the bias electrodes 102 is a thin film 108 of high-insulation, low-dielectric-loss dielectric material which may comprise SiO, $Ta_2O_5$, $SiO_2$ or Alhd $2O_3$. Preferably, the thin film 108 may have a thickness of approximately 1,000 to 2,000 angstromes.

Deposited upon the dielectric thin film 108 in an area underlying the gap between the bias electrodes 102 is the conducting electrode 101 which may comprise a layer of gold or aluminium. The width W of the conducting electrode 101 may be smaller than the gap spacing *P* and is preferably 50 to 300 microns. Connection to the conducting electrode 101 is made by a lead 109 soldered thereto, which lead 109 is connected to a first terminal 110. A second terminal 111 is connected to the DC voltage source 107 by means of a lead 112.

Figure 7:
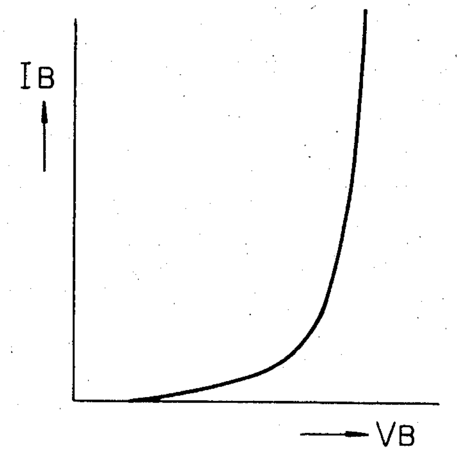
FIG. 7 is a voltage-current characteristic of the nonlinear resistance layer employed in the embodiment of FIG. 6.

FIG. 7 is a graph showing the voltage-current characteristic of the nonlinear resistance layer 100, in which $V_B$ indicates a DC voltage applied across the layer 100 and $I_B$ a DC current flowing therethrough. The characteristic represents a relationship $I_B \propto V_B^n$, the value of $n$ being approximately 3 to 10. From the above expression $I_B \propto V_B^n$, the resistance $R$ of the nonlinear resistance layer 100 is expressed as follows: $R \propto 1/V_B^{(n-1)}$ The resistance $R$ decreases superlinearly with increasing $V_B$. The conductivity $\iota$ of the nonlinear resistance layer 100 increases superlinearly with the increase of $V_B$ in accordance with the following expression: $\iota \propto V_B^{(n-1)}$ Turning back to FIG. 6, the capacitance per unit length C of the variable capacitance device is computed as follows: $C = \gamma\ (\epsilon\ W/d)$ where $\epsilon$ = dielectric constant of the dielectric thin film 108;

$d$ = thickness of the dielectric thin film 108:

$W$ = width of the conducting electrode 101; and $\gamma$ = ratio of equivalent electrode area to conducting electrode area.

It appears from FIG. 7 that when $V_B = 0$ volt, the lateral conductivity $\iota$ of the nonlinear resistance layer 100 is negligibly small. Therefore, the nonlinear resistance material positioned in the gap $P$ of the bias electrods 102 does not act as an equivalent plate electrode which faces the conducting electrode 101. It follows that $\gamma = 0$ and therefore $C = 0$. Of course, it is assumed that 0 does not exactly equal zero because of the edge effect and stray capacity provided by both of the conducting electrode 101 and the bias electrodes 102.

The increase in the applied voltage $V_B$ causes a superlinear increase in the lateral conductivity of the nonlinear resistance layer 100, with a consequent increase in the value of $\gamma$. When the lateral conductivity $\iota$ increases to infinity, $\gamma$ is approximately unity and therefore $C = \epsilon\ W/d$. Thus, it is to be understood that the capacitance appearing between the first and second terminals 110 and 111 of the present variable capacitance device can be widely varied by changing a DC voltage $V_B$ applied to the nonlinear resistance layer 100.

Figure 8:
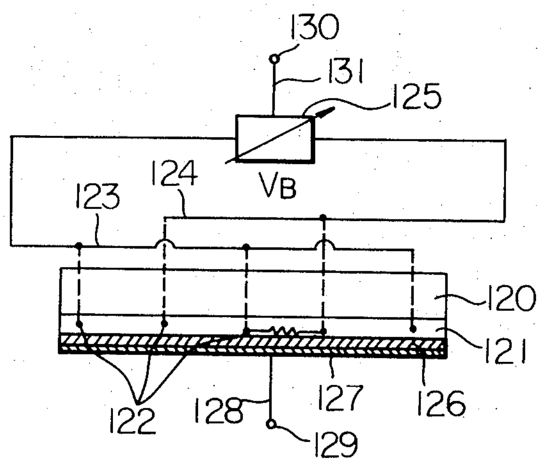
FIG. 8 is a schematic view showing another modification of this invention.
Figure 9:
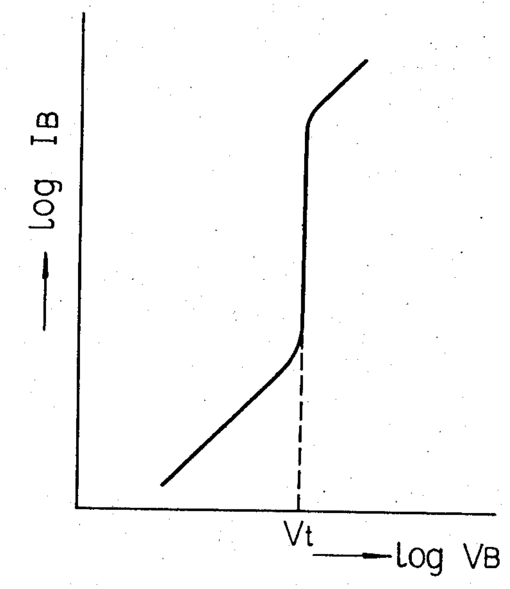
FIG. 9 is a voltage-current characteristic of the nonlinear resistance layer employed in the embodiment of FIG. 8.

FIG. 8 illustrates yet a further embodiment of the present variable capacitance device. In this embodiment, a plate 120 of high-insulation material such as glass is employed as a support member. Deposited upon and in extended area contact with the support plate 120 is a thin layer 121 of nonlinear resistance material which may comprise particles of cadmium selenide (CdSe) activated with a $I_B$ element and a $VII_B$ element such as copper and chloride and mixed with a suitable plastic. The thin layer 121 of nonlinear resistance material may preferably be 50 to 100 microns in thickness. FIG. 9 shows a voltage-current characteristic of the nonlinear resistance layer 121. As shown, the conductivity of the layer 121 increases abruptly at a voltage Vt as a DC voltage $V_B$ applied across the layer 121 is increased. This phenomenon can be accounted for by the fact that a number of electrons trapped by trapping centers are excited to conduction band by the applied DC voltage. Usually, such an abrupt change in conductivity as shown in FIG. 9, which can be regarded as a "resistance breakdown," takes place when an electric field of higher than 0.5 volts/$\mu$ is applied to the layer.

A plurality of fine wires 122 are embedded in the nonlinear resistance layer 121 in uniformly spaced parallel relationship to each other. The fine wires 122 may, for example, comprise tungsten and have a diameter $\phi$ of approximately 10 microns. The pitch $P$ of the uniformly spaced fine wires 122 may preferably be 300 to 600 microns. The plurality of fine wires are interdigitally connected to either one of the two leads 123 and 124 which in turn are connected to a source 125 of DC voltage $V_B$. The voltage $V_B$ of the DC voltage source 125 may be varied as desired.

Deposited upon and in extended area contact with the nonlinear resistance layer 121 is a thin film 126 of high-insulation, high-specific-resistance dielectric material which may comprise metal oxides as employed in the abovedescribed embodiments. A polyester film having a thickness of approximately 6 to 10 microns may be used as the thin film 126.

Deposited upon and in extended area contact with the dielectric thin film 126 is a plate electrode 127 which may comprise a conducting film of gold or aluminum. A lead 128 soldered to the conducting electrode is connected to a first terminal 129. A second terminal 130 is connected to the DC voltage source 125 by means of a lead 131.

When $V_B = 0$, the capacitance $[C]V_B = 0$ appearing between the first and second terminals 129 and 130 is proportional to the ratio of total wire electrode area to plate electrode area ($\gamma = \phi/p$), since the lateral conductivity of the nonlinear resistance layer 121 is zero. As described above, $\phi$ is far smaller than $P$, so that $[C]V_B = 0$ is extremely small. As the voltage $V_B$ is increased, the lateral conductivity $\iota$ increases and the capacitance increases. When $V_B = Vt$, $\iota \rightarrow \delta$, so that $\gamma = 1$, since the nonlinear resistance layer 121 acts as a plate electrode. Thus, it is to be understood that the rate of change of the capacitance $C$ is $[C]V_B \neq 0/[C]V_B = 0 = P/\phi$. Since, in this embodiment, $\phi = 10$ microns and $P = 300$ to 600 microns, an increased rate of change of $C$ of the order of 30 to 60 can be obtained.

Figure 10:
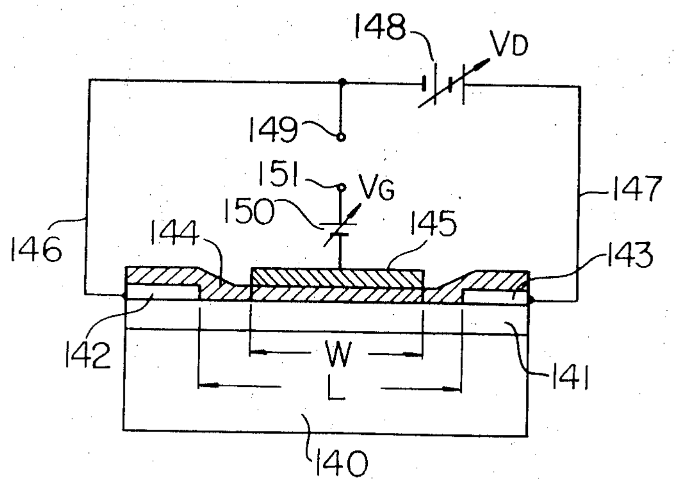
FIG. 10 is a schematic view showing a further modification of this invention using a thin film transistor.

FIG. 10 illustrates a further embodiment of the present variable capacitance device comprising a thin-film transistor. As shown, the device comprises a substrate 140 made of an insulating material such as glass, on which is disposed by vacuum deposition a thin film 141 of N-type semiconducting material which may comprise cadmium sulfide. This thin film 141 has formed therein a channel through which carriers are forced to flow. Deposited on the thin film 141 are source and drain electrodes 142 and 143 which may be conducting films of gold or aluminium. A thin film 144 of dielectric material such as $SiO_2$ or $Al_2O_3$ is deposited upon the N-type thin film 141 and the electrodes 142 and 143. A gate electrode 145 made of gold or aluminium is formed on the dielectric thin film 144 by vapour deposition. It is highly desirable that the width W of the gate electrode 145 be somewhat smaller than the length L of the channel between the source and drain electrodes 142 and 143. Connections to these source and drain electrodes 142 and 143 are made by leads 146 and 147, respectively, which in turn are connected to a source 148 of drain voltage $V_D$. A first terminal 149 is connected to the lead 146 held in electrical contact with the source electrode 142. The gate electrode 145 is connected to a source 150 of gate biasing voltage $V_G$ which in turn is connected to a second terminal 151 of the present variable capacitance device. Since, as illustratively shown, the gate electrode 145 is negatively biased with respect to the source electrode 142, the thin-film device operates in a depletion mode.

Figure 11:
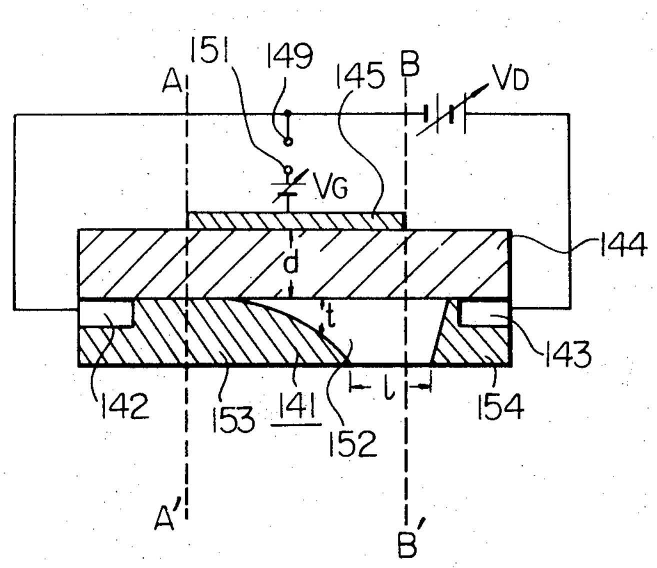
FIG. 11 is a view useful for explaining the principle of operation of the device shown in FIG. 10.

FIG. 11 is a view explaining the principle of operation of the device shown in FIG. 10. As is well known, the conductance of the channel between the source and drain electrodes 142 and 143 is controlled by a DC field developed by the gate bias voltage $V_G$. Since, in this instance, a negative bias is applied to the gate 145, there are developed in the N-type thin film 141 a non-conductive depletion region 152 and equivalent electrode regions 153 and 154 having a high conductivity. As the negative bias $V_G$ is increased, the thickness $t$ of the depletion region 152 increases and the channel conductance is reduced. When the negative bias $V_G$ reaches the pinchoff voltage, the channel becomes pinched off. As the bias voltage $V_G$ is further increased, the length $l$ of the depletion region 152 increases and the area of the equivalent electrode underlying the gate electrode 145 between lines A–A′ and B–B′ is reduced. The capacitance per unit length appearing between the first and second terminals 149 and 151 of the present variable capacitance device is expressed as follows: $C = \gamma\,(\epsilon W/d)$ where $\gamma$ = ratio of equivalent electrode area to gate electrode area;

$d$ = thickness of the dielectric thin film 144;

$\epsilon$ = dielectric constant of the dielectric thin film 144; and $W$ = width of the gate electrode 145.

Thus, as the negative gate bias $V_G$ is increased, $\gamma$ decreases and $C$ is reduced.

The present thin-film transistor can be operated in an enhancement mode by applying a positive bias to the gate electrode 145. As the positive bias is increased, $\gamma$ increases and $C$ is increased. It is to be understood that the capacitance $C$ can be varied over a wide range by changing the relationship in polarity and magnitude between the drain voltage $V_D$ and the gate voltage $V_G$.

Figure 12:
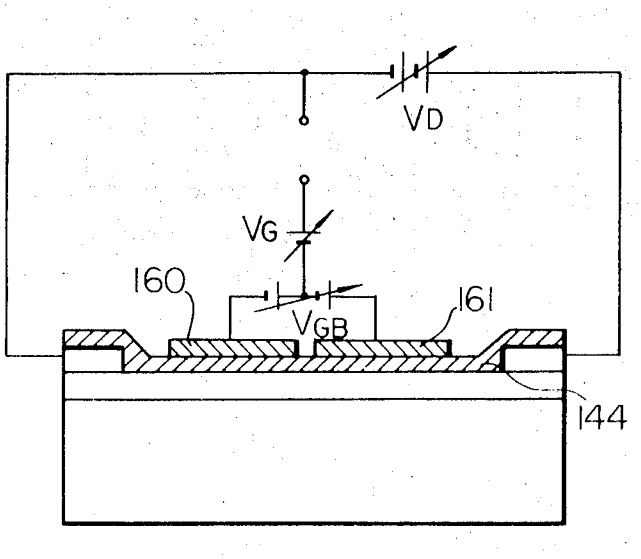
FIG. 12 is a schematic view showing a modification of the variable capacitance device shown in FIG. 10.

FIG. 12 illustrates a still further embodiment of this invention which is different from that shown in FIG. 10 in that the gate electrode 145 is split into two portions 160 and 161, which will be referred to as first and second gate electrodes, respectively, and between which a bias voltage $V_{GB}$ is applied. When the second gate 161 is biased at a positive potential with respect to the first gate 160, the thickness $t$ of the depletion region 152 between the lines A–A′ and B–B′ becomes substantially constant and not abruptly changing as shown in FIG. 11.

Under such conditions, as the negative bias $V_G$ is increased, $t$ increases while $\gamma = 1$, and $C$ is reduced. When the bias $V_G$ reaches the pinch-off voltage, the value of $\gamma$ suddenly decreased to zero. Thus, a device having a highly voltage-dependent capacitance can be obtained. When the polarity of the bias voltage $V_{GB}$ is reversed, the thickness $t$ of the depletion region 152 abruptly changes in the direction of length of the channel. Thus, with a negative bias $V_G$ applied to the gate, the increase in $V_{GB}$ causes a corresponding increase in $l$ and a decrease in $\gamma$. It is to be understood that the dependency of $C$ upon $V_G$ can be arbitrarily controlled by changing the polarity and magnitude of $V_{GB}$. Although, in this embodiment, two split electrodes are formed on the dielectric thin film, more than two split electrodes can be employed to which successively increasing bias potentials are applied along the length of the channel, thereby enabling smooth control of the gate voltage dependency of $C$.

Figure 13:
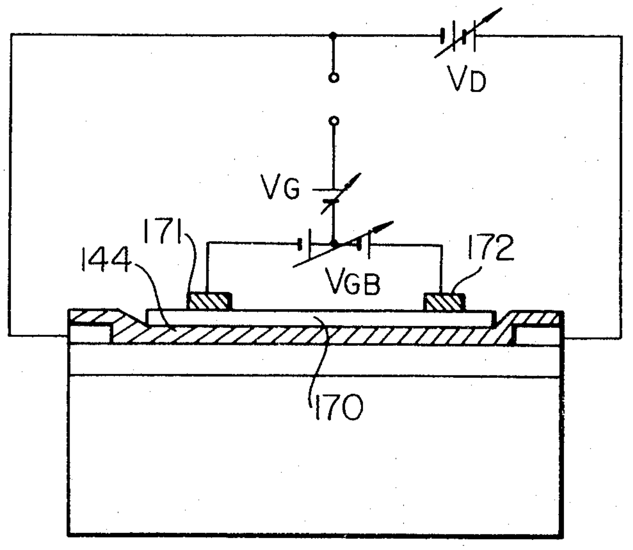
FIG. 13 is a schematic view showing another modification of the variable capacitance device of FIG. 10.

FIG. 13 illustrates a further modification of this invention which is different from the embodiment of FIG. 10 in that there is deposited on the dielectric thin film 144 a resistive layer 170 on which are formed two gate electrodes 171 and 172 having a limited width. The resistive layer 170 may be formed by sputtering tantalum or nichrome. With such an arrangement, continuously increasing bias potentials are developed in the resistive layer 170 in the direction of length thereof, thereby enabling more smooth control of the gate voltage dependency of C. Although the above described thin-film transistors have formed therein the thin film of N-type conductivity, it is to be understood that a thin film having a P-type conductivity can be employed.

Figure 14:
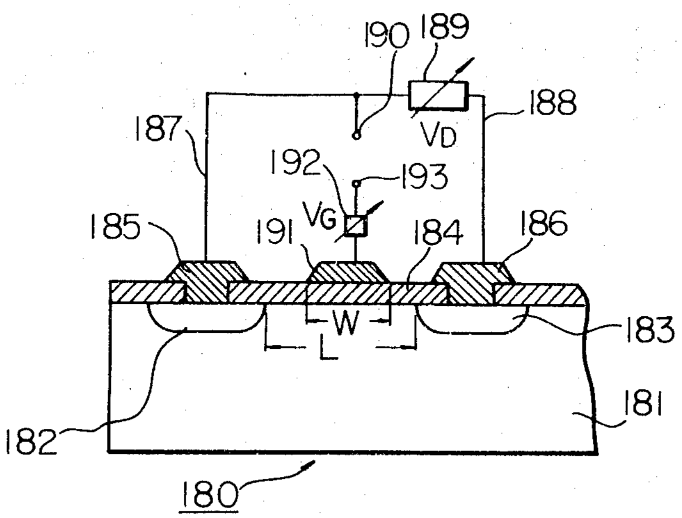
FIG. 14 is a schematic view showing a further embodiment of this invention employing a MOS or MIS transistor.

FIG. 14 illustrates yet a further modification of this invention employing a MOS or MIS transistor. The transistor 180 comprises a substrate 181 formed of N-type Si or GaAs and source and drain portions 182 and 183 formed in the substrate 181 as by selective diffusion and having a $P^+$-type conductivity. Deposited upon the substrate 181 is a thin film 184 of dielectric material which may comprise $SiO_2$ or SiN. Metal electrodes 185 and 186 are disposed so that they overlie the source and drain portions 182 and 183, respectively. Connections to these metal electrodes 185 and 186 are made by leads 187 and 188, respectively, which leads are connected to a source 189 of drain voltage $V_D$. A first terminal 190 of the present device is connected to the lead 187.

Deposited upon and in limited area contact with the dielectric thin film 184 is a gate electrode 191 which may comprise a conducting film of gold or aluminium. The width $W$ of the gate electrode 191 should be somewhat smaller than the length $L$ of the channel between the source and drain portions 182 and 183. The gate electrode 191 is connected to a bias voltage source 192 which in turn is connected to a second terminal 193 of the present variable capacitance device. In this embodiment, also, it is possible to arbitrarily control the capacitance by changing the relationship in polarity and magnitude between the drain voltage and gate voltage. Although description has been made with respect to the field-effect transistor having a substrate of N-type conductivity, it is to be understood that a field-effect transistor having a P-type substrate and $N^+$-type source and drain portions can also be employed.

What is claimed is:

1. A variable capacitance device having a variable capacitance between two terminals thereof, which comprises:

a thin film made of insulating dielectric material;

a conducting plate electrode disposed on one surface of said thin film and connected to one of said two terminals;

a non-linear resistance layer disposed on the other surface of said thin film;

a pair of bias electrodes contacted with said non-linear resistance layer and respectively connected to the other of said two terminals, said bias electrodes being disposed between said insulating dielectric material and said non-linear resistance layer and defining a gap between the respective bias electrodes and with said conducting plate electrode underling this gap; and means for exserting a bias voltage across said a pair of bias electrodes.

2. A variable capacitance device according to claim 1, in which said non-linear resistance layer is composed of cadmium sulfide activated with chloride and mixed with a binder.

3. A variable capacitance device according to claim 1, in which said non-linear resistance layer is composed of cadmium selenide activated with copper or chrolide and mixed with a binder.

4. A variable capacitance device according to claim 1, in which said bias electrodes are made of gold.

5. A variable capacitance device according to claim 1, in which said bias electrodes are made of aluminium.

6. A variable capacitance device having a variable capacitance between two terminals thereof, which comprises:

a thin film made of insulating dielectric material;

a conductive plate electrode disposed on one surface of said thin film and connected to one of said two terminals;

a non-linear resistance layer disposed on the other surface of said thin film;

a plurality of linear metalic conductors contacted with said non-linear resistance layer in uniformly spaced parallel relationship to one another and connected through at least one capacitor to the other of said two terminals; and means for impressing a bias voltage across the alternate some of said conductors and the remaining conductors.

7. A variable capacitance device according to claim 6, in which said conductors are thin and fine wires.

8. A variable capacitance device having a variable capacitance between two terminals thereof, which comprises:

a thin film made of insulating dielectric material;

a conducting plate electrode disposed on one surface of said thin film and connected to one of said two terminals;

a non-linear resistance layer disposed on the other surface of said thin film;

at least two electrodes associated with said non-linear resistance layer and means being connected to the other of said two terminals; and means for exserting a bias voltage across said at least two electrodes so as to change the resistance of said non-linear resistance layer thereby causing variation of a capacitance between said two terminals.

* * * * *